US009762709B1

(12) United States Patent
Snyder et al.

(10) Patent No.: US 9,762,709 B1
(45) Date of Patent: Sep. 12, 2017

(54) UNIBODY DESK TELEPHONE

(71) Applicant: Cisco Technology, Inc., San Jose, CA (US)

(72) Inventors: Ian M. Snyder, San Francisco, CA (US); Matthew Cho, San Francisco, CA (US); Morgan Teachworth, Mountain View, CA (US); Jennifer Ouk, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/066,940

(22) Filed: Mar. 10, 2016

(51) Int. Cl.
*H04M 1/00* (2006.01)
*H04M 1/02* (2006.01)
*H04M 1/23* (2006.01)

(52) U.S. Cl.
CPC ........... *H04M 1/02* (2013.01); *H04M 1/0295* (2013.01); *H04M 1/23* (2013.01)

(58) Field of Classification Search
CPC ......... H04M 1/02; H04M 1/23; H04M 1/0295
See application file for complete search history.

(56) References Cited

U.S. PATENT DOCUMENTS

| 6,711,419 | B1* | 3/2004 | Mori ................... G06F 1/1632 455/556.1 |
| 2002/0018051 | A1* | 2/2002 | Singh .................... G06F 3/0488 345/173 |
| 2012/0306757 | A1* | 12/2012 | Keist ................... B29C 45/0053 345/168 |

* cited by examiner

*Primary Examiner* — Tuan D Nguyen
(74) *Attorney, Agent, or Firm* — Polsinelli PC

(57) ABSTRACT

An example system for a telephone can include a unibody plate having a front portion and a back portion, a back plate mounted to the back portion of the unibody plate, and a touch sensitive display panel mounted to the front portion of the unibody plate. The unibody plate can be of a single piece of milled material. The back portion of the back plate, when combined with the unibody plate, can forming at least one cavity such as a speaker cavity. The speaker cavity can include a speaker mount, a speaker cradle, and a speaker. The speaker cradle can have an interior portion and be secured to the back plate. The speaker mount can engages the back portion of the unibody plate and the rim of speaker cradle. The speaker can be mounted within the interior portion of the speaker cradle.

18 Claims, 10 Drawing Sheets

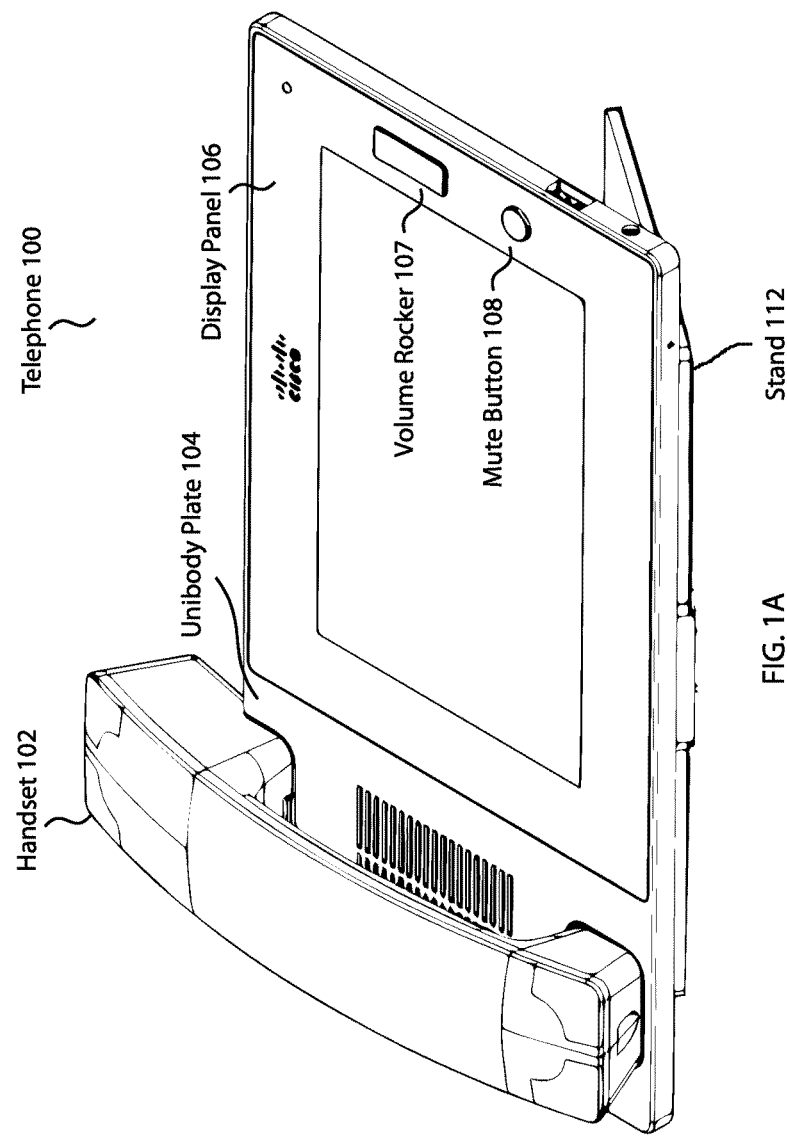

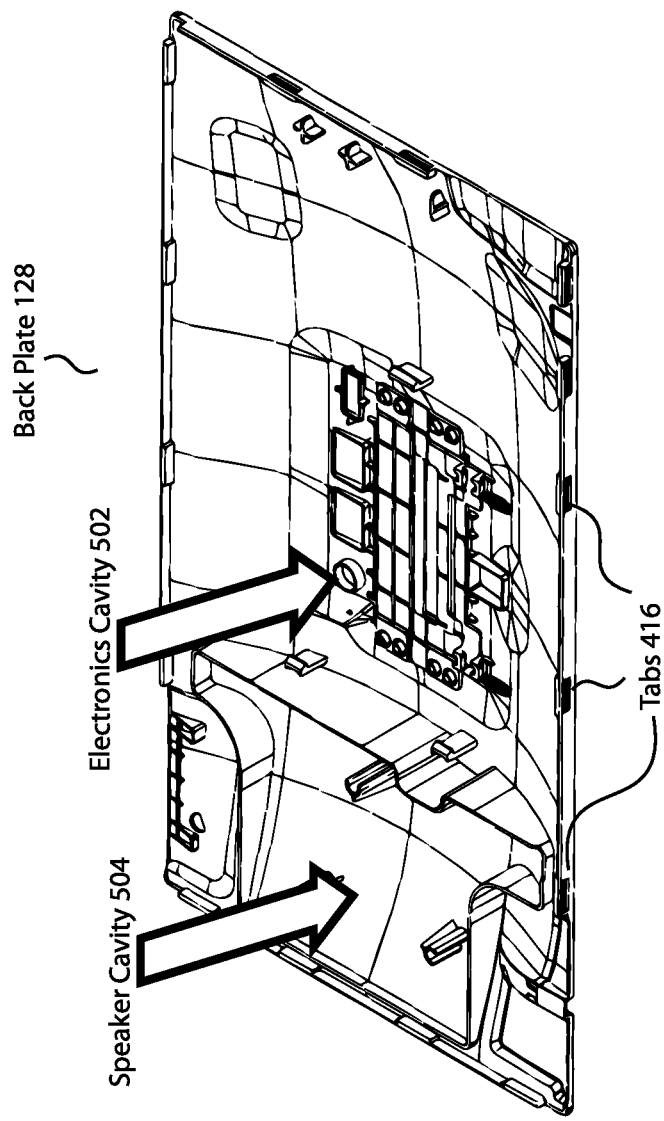

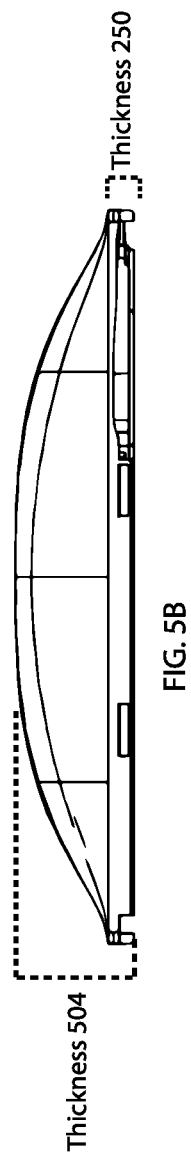

UNIBODY DESK TELEPHONE

BACKGROUND

Although many people are accustomed to modern "smart phones" that they carry around in their pocket, the small form factor is less ideal for prolonged use. When portability is not a priority, such as in a desk environment, people prefer larger telephones that provide better ergonomics, desk stability, and ready availability. However, these large telephones can seem outdated in comparison to their thinner and lighter consumer counterparts.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 1A illustrates an example telephone according to various embodiments;

FIG. 5A illustrates an example back plate according to various embodiments; and

FIG. 5B illustrates an example side view of back plate according to various embodiments.

DESCRIPTION OF EXAMPLE EMBODIMENTS

Figure 1B:
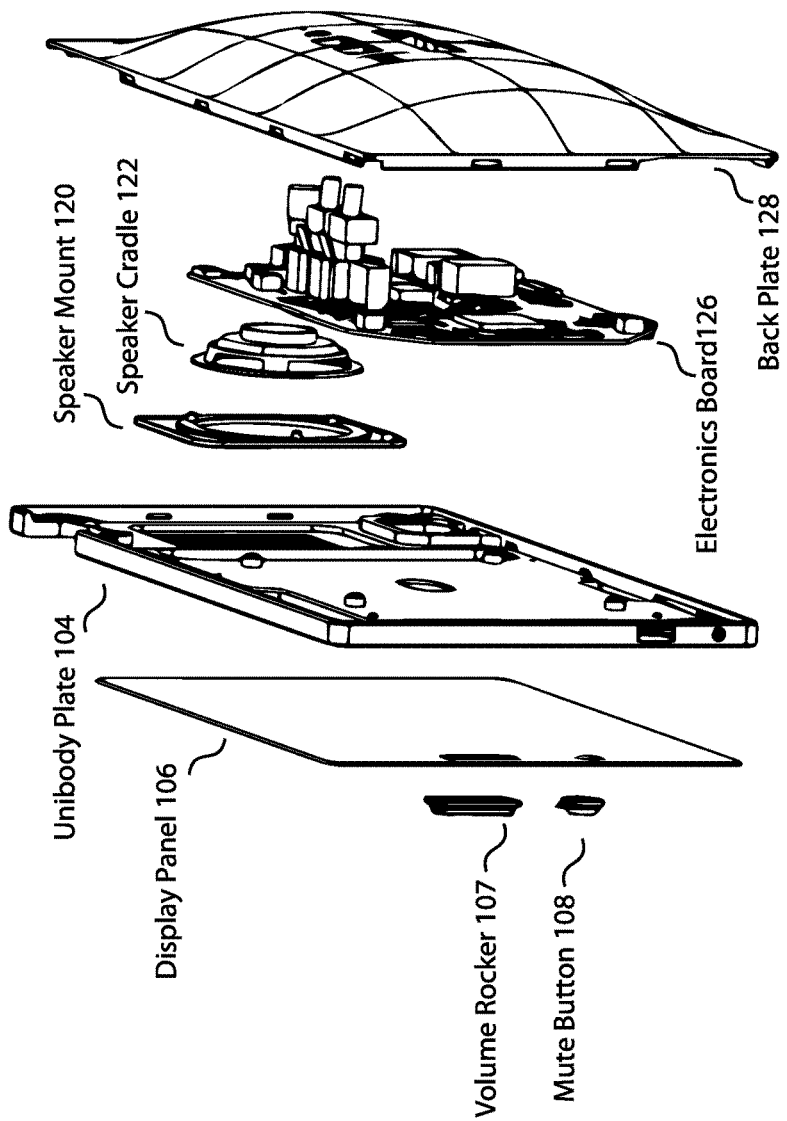
FIG. 1B illustrates an exploded view of example telephone according to various embodiments.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

The present technology includes a unibody desk telephone. An example system for a telephone including the present technology can include a unibody plate having a front portion and a back portion, a back plate mounted to the back portion of the unibody plate, and a touch sensitive display panel mounted to the front portion of the unibody plate. The unibody plate can be of a single piece of milled material. The back portion of the back plate, when combined with the unibody plate, can form at least one cavity such as a speaker cavity. The speaker cavity can include a speaker mount, a speaker cradle, and a speaker. The speaker cradle can have an interior portion and be secured to the back plate. The speaker mount can engage the back portion of the unibody plate and the rim of speaker cradle. The speaker can be mounted within the interior portion of the speaker cradle.

DESCRIPTION

As shown in FIG. 1A, telephone 100 can be a modern and attractive desk or wall-mounted telephone. In some embodiments, telephone 100 has handset 102 and display panel 106. Phone 100 can have physical buttons such as volume rocker 106 and mute button 108. Phone 100 can contain unibody plate 104 for aesthetic design and structural support. In some embodiments, telephone 100 can be placed on a desk in various positions provided by stand 112. In some embodiments, stand 112 can fold with the remainder of telephone 100 allowing telephone 100 to be mounted on a wall.

FIG. 1B depicts an exploded view of some components of telephone 100. For example, display panel 106 can be placed on the front portion of unibody plate 104 while speaker mount 120, speaker cradle 122, and electronics board 126 can be placed on the back portion (e.g., rear) of unibody plate 104. Backplate 128 can be placed behind unibody plate 104 and can cover internal components such as electronics board 126 while also providing some structural support. Volume rocker 106 and mute button 108 can be placed in front of unibody plate 104 and within openings in display panel 106. It should be understood that FIGS. 1A and 1B are not complete representations of the components that can comprise telephone 100. In some embodiments, telephone 100 has more or fewer components. For example, in some embodiments, telephone 100 can omit handset 102 and in some embodiments, telephone 100 can have an antenna for wireless communication.

Display panel 106 can be a touchscreen display panel. In some such embodiments, display panel 106 can present various interfaces such as a 10-key dialer, a directory, status indicators, etc. In some embodiments, display panel 106 can facilitate video telephony. Display panel 106 can be combined with haptic feedback to enhance touchscreen usability and provide intuitive interaction. Display panel 106 can comprise a hard transparent panel such as glass. Display panel 106 can have an opaque bezel surrounding a display element such as a liquid crystal display. Within the bezel region, there can be translucent or transparent regions through which indicator lights can be seen. In some embodiments, the bezel can have one or more apertures cut out, through which buttons (e.g., mute button 108) can pass through. In some embodiments, there is a translucent or transparent region surrounding an aperture where an indicator light can be seen. For example, if the aperture is a circle and mute button 108 passes through the circle, there can be a translucent ring around the aperture that, when illuminated, can indicate that telephone 100 is muted. In some embodiments, display panel 106 can contain processing and battery power so that it can be removed and operate independently from telephone 100, for example as a tablet computer or mobile telephone. In some embodiments, display panel 106 is attached to telephone 100 along with a cushion element such as rubber to absorb small vibrations that might result from user operation and to provide a seamless fit between display panel 106 and the rest of telephone 100.

Figure 2A:
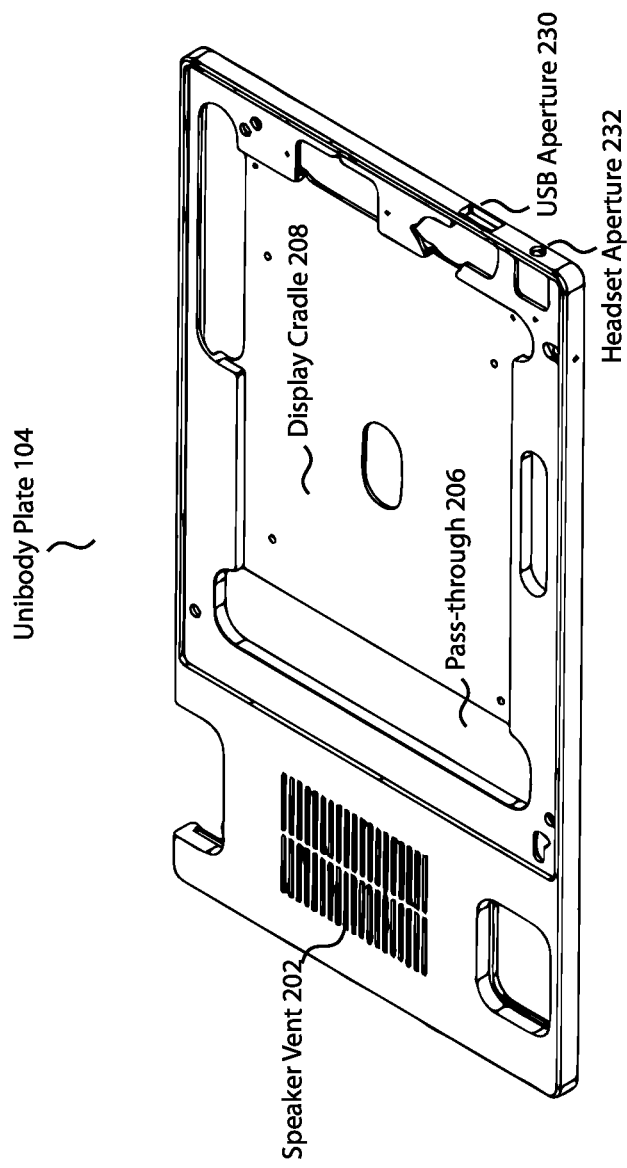
FIG. 2A illustrates an example unibody plate according to various embodiments.

FIG. 2A depicts an example unibody plate 104 in isolation from other components. In some embodiments, unibody plate 104 is a single piece of material. Unibody plate 104 can be made out of aluminum, magnesium, plastic, wood, carbon fiber, etc. and can be machined, die-cast, forged, carved, 3D printed, grown, molded, etc. Unibody plate 104 can be created using a combination of materials and techniques. Unibody plate 104 can be made of denser materials that, because of the increased weight, signal to the user that telephone 100 is a premium product of sturdy construction. Unibody plate 104 can have exposed portions such as speaker vent 202 as well as hidden portions (i.e., hidden when telephone 100 is assembled) such as display cradle 208. Unibody plate 104 can contain openings such as pass-through 206, USB aperture 230, and headset aperture 232 whereby components such as cables can pass through or be accessed through unibody plate 104. In some embodiments, such openings are in places not required for structural support. In some embodiments, openings can be created to optimize weight, encourage heat dissipation, and minimize material cost. In some embodiments, such an optimal weight is a weight that minimizes slippage of telephone 100 while resting on a desk during normal use. Because telephone 100 utilizes unibody plate 104, telephone 100 can be thinner as the unibody plate provides strength and rigidity to the assembled device. The materials chosen for the unibody plate must be able to provide the requisite strength and rigidity to support all of the phone components, and especially the display panel. Components can be glued or fastened to unibody plate 104.

Unibody plate 104 can have a front portion and a back portion. In FIG. 2A, the front portion is the visible portion while the back portion is the opposite side (shown in FIG. 2C). In some embodiments, back plate 128 is mounted to the back portion of unibody plate 104. In some embodiments, the perimeter of unibody plate has a ridge designed to receive clips on back plate 128.

Front panel 104 can snap in, rest upon, or otherwise be supported by unibody plate 104. In some embodiments, display cradle 208 can be a recessed portion of unibody plate 104 wherein display panel 106, when installed, lies flush with an exposed surface of unibody plate 104.

Speaker vent 202 can be a grating, mesh, collection of apertures, etc. to mitigate the passage of dust and debris while allowing sound to pass through.

Figure 2B:
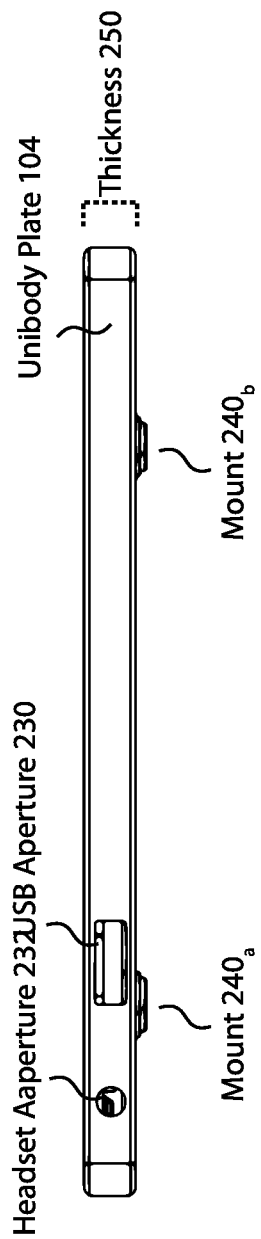
FIG. 2B illustrates a side view of an example unibody plate according to various embodiments.
Figure 2C:
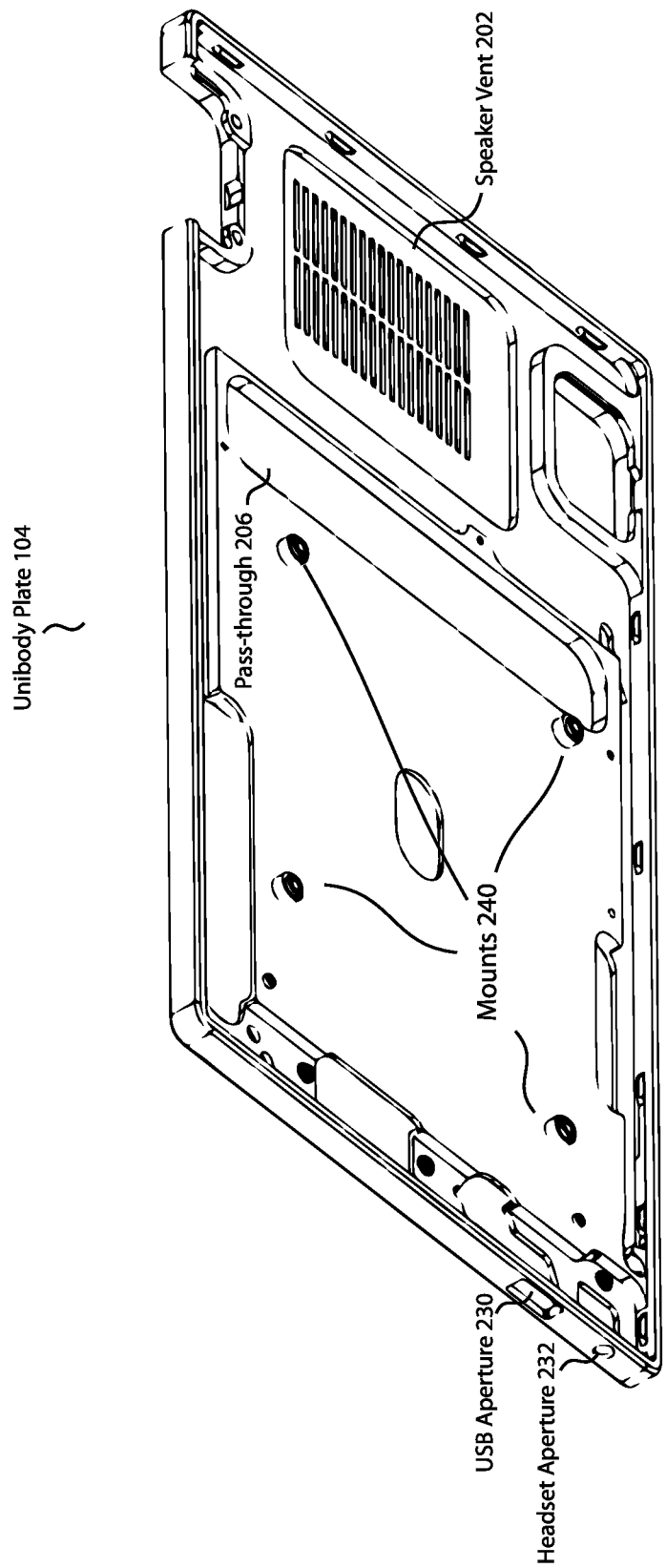
FIG. 2C illustrates a back view of an example unibody plate according to various embodiments.

FIG. 2B shows a side view of unibody plate 104. Thickness 250 can be the maximum width of unibody plate 104 (excluding mount 240a and mount 240b which can be located towards the center of unibody plate 104). In some embodiments, thickness 250 also represents the perimeter thickness of telephone 100 (excluding a fillet) while telephone 100 can have a greater thickness towards the center of telephone 100. Therefore, an exposed perimeter of unibody plate 104 can appear to substantially define the overall thickness of telephone 100, with the thicker elements being relatively hidden. Thickness 250 can be greater than 4.5 millimeters ("mm") to accommodate USB aperture 230 and less than 20 mm. Other effective ranges of thickness 250 can include 5 mm-9 mm and 7.5 mm-8.5 mm.

Figure 3A:
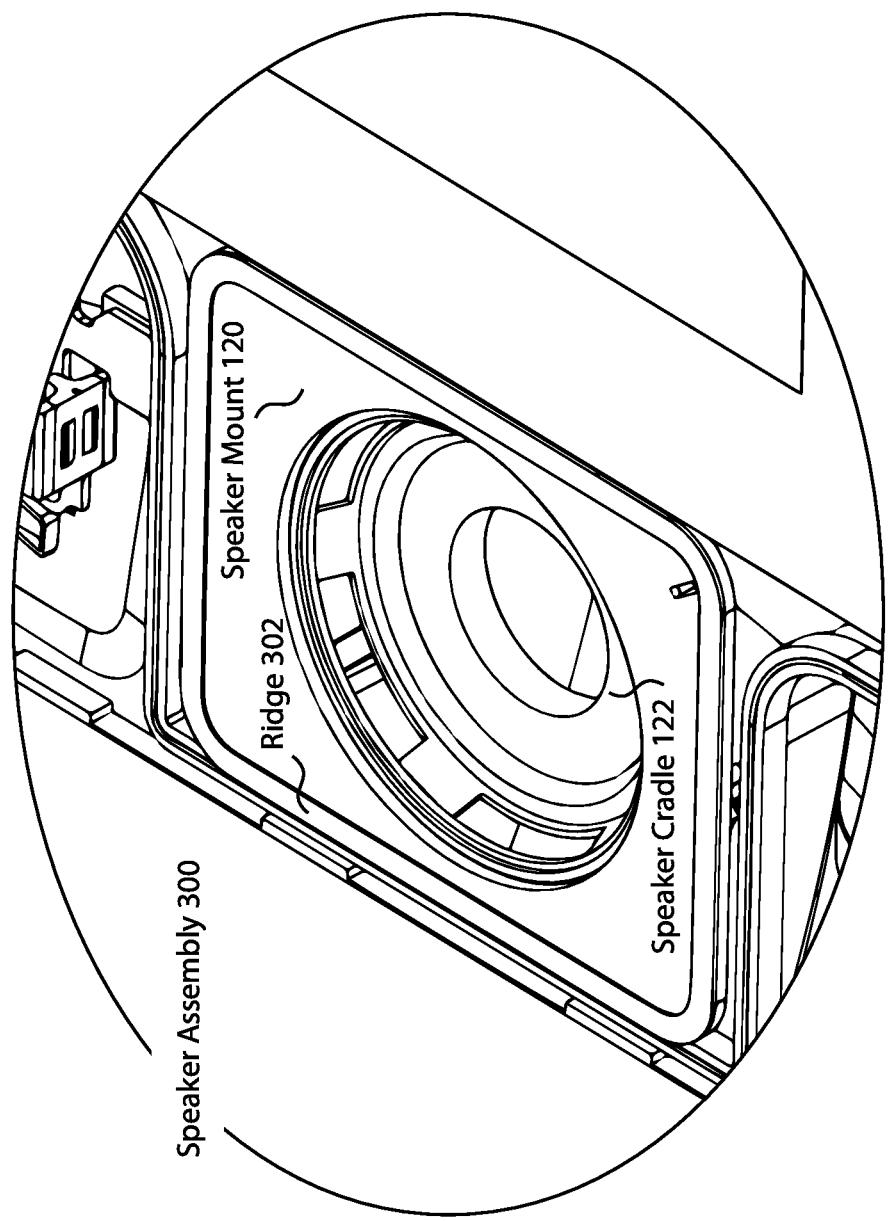
FIG. 3A illustrates an example speaker assembly according to various embodiments.

FIG. 3A shows speaker assembly 300. Speaker assembly 300 can be integral to unibody plate 104 or be made of separate components. Speaker assembly 300 can house a speaker (not depicted) that can be used for "speakerphone" capabilities of telephone 100. In some embodiments, speaker assembly 300 is set behind speaker vent 202 formed in the unibody plate. As depicted in FIG. 1B, speaker assembly can comprise speaker mount 120 and speaker cradle 122. In some embodiments, speaker mount 120 and speaker cradle 122 are one integrated unit. In some embodiments, speaker mount 120 can have ridge 302 as a feature. Ridge 302 can provide an acoustic seal by interfacing with the unibody plate to provide enhanced sound quality from speaker assembly 300 and prevent rattling between speaker assembly 300 and unibody plate 104. In some embodiments, ridge 302 is rubber, silicone, glue, adhesive, wood, plastic, etc. In some embodiments, ridge 302 is a feature that is contiguous with speaker mount 300. In some embodiments, speaker cradle 122 does not hold a speaker but is a speaker (i.e., a transducer).

Figure 3B:
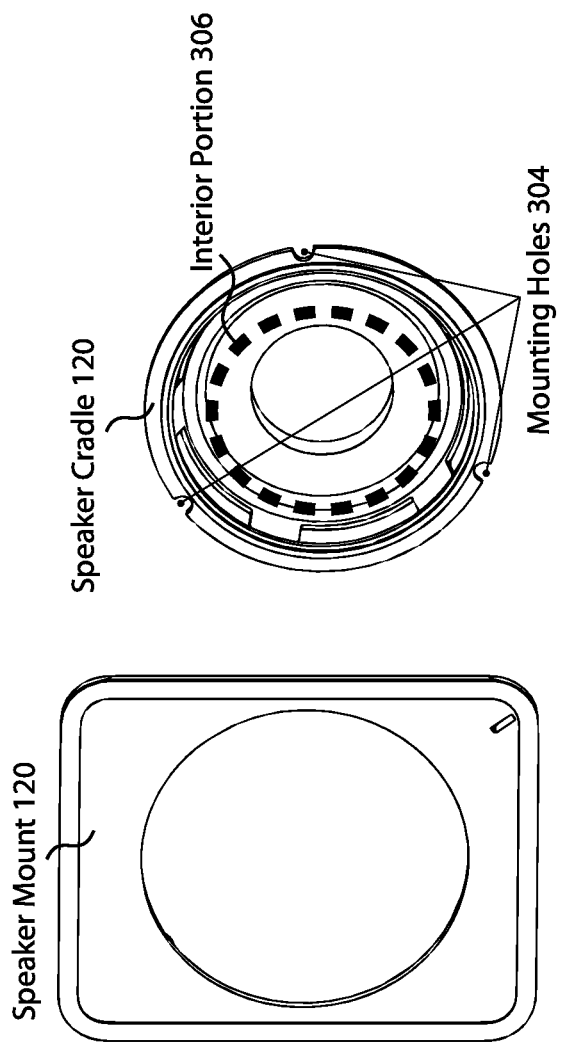
FIG. 3B illustrates an exploded view of an example speaker assembly according to various embodiments.

FIG. 3B shows an exploded view of speaker assembly 300 including speaker mount 120 and speaker cradle 120. Speaker cradle 120 can have an interior portion 306 formed inside of speaker cradle 120 and mounting holes 304 for mounting speaker cradle 120 to back plate 128.

Figure 4:
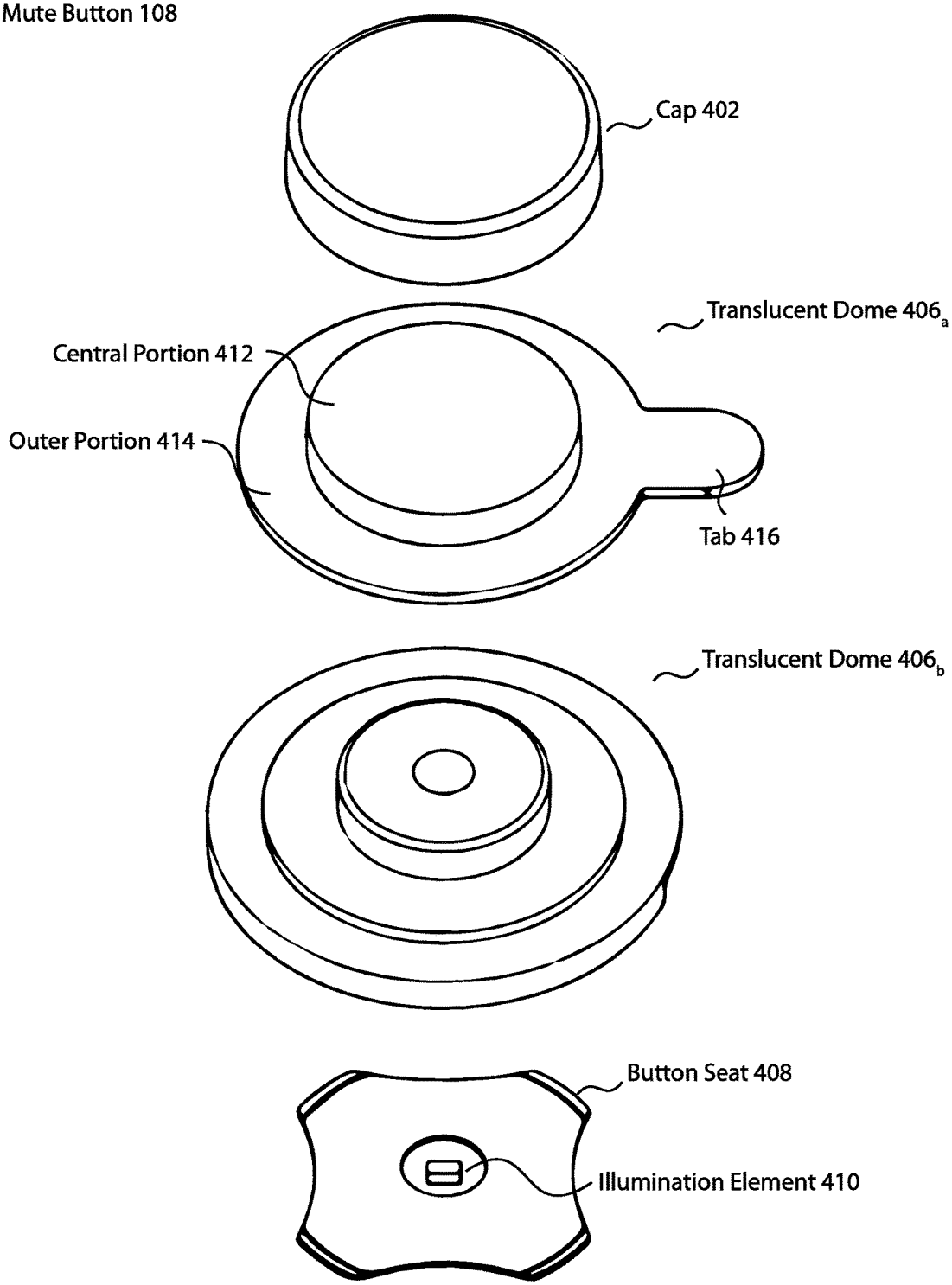
FIG. 4 illustrates an exploded view of an example mute button according to various embodiments.

FIG. 4 depicts an exploded view of mute button 108. As mentioned previously, in some embodiments, mute button 108 is positioned alongside a touchscreen and within an aperture in display panel 106. In some embodiments, other buttons (e.g., volume rocker 106) can be made using the principles disclosed for mute button 108 but for other tasks such as "pick up", "hang up", "speakerphone", "volume", etc. Mute button 108 can provide a tactile response to help a user recognize that mute button 108 has been pressed. In some embodiments, mute button 108 or a region near or surrounding mute button 108 can be illuminated to indicate mute button's 108 status, for example, when telephone 100 is muted.

Cap 402 can be affixed to translucent dome 406a which can rest on or be integral to translucent dome 406b which can be held by button holder 408. Translucent dome 406a and translucent dome 406b can collectively be referred to as translucent dome 406. Mute button 108 can comprise illumination element 410 that can provide a status indicator for mute button 108. Cap 402 can be opaque, translucent, or a combination of the two. For example, cap 402 can be generally opaque except for a translucent icon or design on top. Cap 402 can have a contact portion where a user can push to activate mute button 108. Cap 402 can be fixed to translucent dome 406 using adhesive, friction, etc. In some embodiments, cap 402 is a material that is painted on or combined with translucent dome 406.

Translucent dome 406 can comprise two components that are jointly molded using a double shot injection mold. In some embodiments, translucent dome 406a can be a stiff material while translucent dome 406b can be a more flexible material such as silicone. In some embodiments, translucent dome 406a has central portion 412 for receiving cap 402 and outer portion 414. Outer portion 414 can diffuse light coming from illumination element 410 so that it appears uniform from above. For example translucent dome 406 can be located directly under display panel 106. This can permit a ring of uniform light to be seen through display panel 106 in a region surrounding the cap which resides within an opening in display panel 106. Tab 416 can protrude horizontally from translucent dome 406a and activate a switch in telephone 100 that detects that mute button 108 has been depressed.

Button seat 408 can be attached to a PCB and can hold translucent dome 406 in place to prevent slipping. Button seat 408 can have a raised lip for this effect.

FIG. 5A shows the inside of back plate 128 in isolation. Back plate 128, when combined with other components of telephone 100, can form one or more cavities. For example, speaker cavity 504 to house speaker assembly 300 and electronics cavity 502. Electronics cavity 502 can be a central location within back plate that provides space for more bulky components of telephone 100 to be hidden. For example, electronics cavity can accommodate at least one telecommunications port (e.g., an RJ45 port, RJ11 port, etc.) as well as a power receptacle. Back plate 128 can be attached to a back portion of unibody plate 104. In some embodiments, back plate 128 has tabs 416 for connecting to unibody plate 104. This can make it so that back plate 128 does not require screws to mount it onto unibody plate 104 and thus back plate 128 can have no visible screws or screw holes (though internal, hidden, screws and holes may be used).

FIG. 5B shows a side view of back plate 128. As discussed above, electronics cavity 502 can be located centrally within back plate 128 to keep thickness 250 around the perimeter of telephone 100 to a minimum and creating the impression that thickness 250 is the defining width of telephone 100. The shape of back portion of back plate 128 can be triangular, curved, trapezoidal etc. Thickness 504 can represent the width of back plate 128 at electronics cavity 502 (e.g., defining the "thickest dimension" of the "thickest portion"). Thickness 504 can be 15 mm-50 mm, including ranges of 20 mm-25 mm, and 22 mm-23 mm. Thickness 504 can be 22.5 mm. Various thicknesses 504 can be appropriate based on the size and type of components in electronics cavity 502. Backplate can have openings through which cables and pass.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A telephone comprising: a unibody plate having a front portion and a back portion; a back plate mounted to the back portion of the unibody plate, the back plate combined with the unibody plate forming at least one cavity; and a touch sensitive display panel mounted to the front portion of the unibody plate; wherein the at least one cavity is a speaker cavity, the speaker cavity comprising: a speaker assembly including a speaker mount, a speaker cradle, and a speaker, wherein: the speaker cradle comprises an interior portion and is secured to the back plate, the speaker mount engages the back portion of the unibody plate and a rim of speaker cradle, and the speaker is mounted within the interior portion of the speaker cradle.

2. The telephone of claim 1 wherein the unibody plate is comprised of a single piece of milled material.

3. The telephone of claim 1 wherein the at least one cavity further includes an electronics cavity in addition to the speaker cavity.

4. The telephone of claim 1, wherein at least one opening is formed within the touch sensitive display panel to accommodate a physical control button.

5. The telephone of claim 4, wherein the physical control button is a mute button assembly, the mute button assembly comprising:
 a light-emitting diode, a translucent dome, and an opaque contact portion, the opaque contact portion seated on top of a central portion of the translucent dome such that an outer portion of the translucent dome is not covered by the opaque contact portion, and the translucent dome covering the light-emitting diode, whereby light emitted from the light-emitting diode is visible through the outer portion of the translucent dome.

6. The telephone of claim 5, wherein the outer portion of the translucent dome is located directly under the touch sensitive display panel while the opaque contact portion protrudes through the opening formed within the touch sensitive display panel, whereby light emitted from the light-emitting diode is visible through the touch sensitive display panel and surrounding the opaque contact portion.

7. The telephone of claim 6, wherein the light-emitting diode is configured to emit light upon actuation of the mute button.

8. The telephone of claim 1, wherein the wherein the at least one cavity further includes an electronics cavity, the electronics cavity having a bulged shape, wherein the thickest portion of the bulge accommodates at least one telecommunications port.

9. The telephone of claim 1, wherein the telecommunications port is an RJ45 jack and the bulge is configured to be large enough to accommodate the RJ45 jack.

10. The telephone of claim 1, wherein the electronics cavity is between 1-5 centimeters at its thickest dimension.

11. The telephone of claim 1, wherein the at least one cavity is a speaker cavity, the speaker cavity comprising:
   a speaker assembly including a speaker mount and a speaker, wherein:
      the speaker is secured to the back plate; and
      the speaker mount engages the back portion of the unibody plate and the rim of speaker.

12. The telephone of claim 1, wherein the back plate does not have externally visible screw holes and is mounted to the back portion of unibody plate using tabs.

13. A system comprising: a unibody plate having a front portion and a back portion; a back plate mounted to the back portion of the unibody plate, the back plate combined with the unibody plate forming at least one cavity; and a touch sensitive display panel mounted to the front portion of the unibody plate; wherein the at least one cavity is a speaker cavity, the speaker cavity comprising: a speaker assembly including a speaker mount, a speaker cradle, and a speaker, wherein: the speaker cradle comprises an interior portion and is secured to the back plate, the speaker mount engages the back portion of the unibody plate and a rim of speaker cradle, and the speaker is mounted within the interior portion of the speaker cradle.

14. The system of claim 13 wherein the unibody plate is comprised of a single piece of milled material.

15. The system of claim 13 wherein the at least one cavity further includes an electronics cavity in addition to the speaker cavity.

16. The system of claim 13, wherein at least one opening is formed within the touch sensitive display panel to accommodate a physical control button.

17. The system of claim 16, wherein the physical control button is a mute button assembly, the mute button assembly comprising:
   a light-emitting diode, a translucent dome, and an opaque contact portion, the opaque contact portion seated on top of a central portion of the translucent dome such that an outer portion of the translucent dome is not covered by the opaque contact portion, and the translucent dome covering the light-emitting diode, whereby light emitted from the light-emitting diode is visible through the outer portion of the translucent dome.

18. The system of claim 17, wherein the outer portion of the translucent dome is located directly under the touch sensitive display panel while the opaque contact portion protrudes through the opening formed within the touch sensitive display panel, whereby light emitted from the light-emitting diode is visible through the touch sensitive display panel and surrounding the opaque contact portion.

* * * * *